United States Patent Office 3,662,057
Patented May 9, 1972

---

3,662,057
METHOD OF FORMING AN EXPANDED POLYETHYLENE CAST ON A LIVING BODY
Joseph George Webster, Croydon, and William Henry Tuck, Kenton, England, assignors to Bakelite Xylonite Limited, London, England
Continuation of application Ser. No. 731,253, May 22, 1968. This application Oct. 21, 1969, Ser. No. 868,242
Claims priority, application Great Britain, May 25, 1967, 21,473/67
Int. Cl. B29d 27/00
U.S. Cl. 264—321                                   1 Claim

ABSTRACT OF THE DISCLOSURE

Method of forming a cast for a living body from a sheet of partially cross-linked nitrogen expanded low density polyethylene having a thickness of between about 0.3 centimeters and about 2.5 centimeters. The method comprises heating the sheet to a temperature between 130° C. and 150° C. to render it pliable, then bringing the sheet into contact with a portion of a living body, shaping it so as to complement the portion of the living body and cooling the sheet to cause it to resume its original rigidity.

---

This is a continuation of application Ser. No. 731,253, filed May 22, 1968, and now abandoned.

This invention relates to thermoplastics materials. More particularly, the invention is concerned with articles in the form of shaped, light-weight cellular rigid or semi-rigid thermoplastics materials, to methods of shaping them, and to composite structures which may be used in making the articles.

Rigid and semi-rigid thermoplastics materials in the form of light-weight cellular structures are well-known, and a variety of procedures are available for their production. Materials of this type which, for convenience, will be referred to in this specification and appended claims as expanded thermoplastics materials, because of their cellular, i.e. macroporous structure, have a low density, a low thermal conductivity and a low heat storage capacity. An instance of such as expanded thermoplastics material is the cross-linked cellular polyethylene commerically available as Plastazote sheet (Plastazote is a registered trademark), which is made by a process as described and claimed in British patent specification No. 899,389 involving heating, in the presence of nitrogen, a low density polyethylene which has been modified through partial cross-linking either by ionizing radiation or treatment with an organic peroxide.

We have now found that such as expanded thermoplastics material when heated to a temperature which plasticises it without destroying its essential cellular character becomes pliable and, in this condition, can readily be moulded to the shape of a body with which it is contacted. Moreover, when the expanded material is allowed to cool and set, it becomes rigid or semi-rigid again, so that it holds the configuration of the body, even in the event the body is removed from the material before it has cooled and set, without the need for an additional shaping and retaining member.

Accordingly, the present invention provides, in one of its aspects, an article in the form of a rigid or semi-rigid, expanded thermoplastics material with a low thermal conductivity and heat storage capacity, which has been thermoplastically shaped to the configuration of a body by contact therewith.

For some applications, especially where extra strength and stiffness are sought, it may be desirable to reinforce the expanded thermoplastics material by incorporating within it one or more reinforcing members. In this event, the reinforced articles are derived from composite structures comprising a mass of an expanded thermoplastics material and, embedded within the expanded mass, one or more reinforcing members. Such composite structures, and the reinforced articles derived from them are within the scope of this invention. The reinforcing member, which should be relatively stiff at room temperature, must be pliable at the plasticising temperature of the appended material, but should not break down at this temperature. Advantageously, the reinforcing member is a sheet or strip of a thermoplastics material, preferably the same material in its unexpanded, i.e. higher density, form as the material of the main mass.

The invention further provides in another of its aspects a method of thermoplastically shaping a rigid or semi-rigid expanded thermplastics material to the configuration of a body which comprises heating the material, which may have one or more reinforcing members embedded within it, to a temperature which plasticises it without destruction of its essential cellular nature so that it becomes pliable, bringing the plasticised material and the body into contact so as to form an impression in the material and, thereafter, allowing the material to cool when it sets in the configuration of the body.

The expression "thermoplastically shaping" as used in this specification and appended claims, indicates that the shaping of the material is accomplished, in part, through plasticising the material in which condition it is pliable and can readily be moulded.

The articles according to this invention have various applications, but they are particularly valuable in the surgical and veterinary fields, and as wrappings, casings and packages for objects.

In connection with the surgical and veterinary applications, it has been found that the expanded thermoplastics material can provide a light-weight cast, splint, or other orthopaedic or surgical support which is useful in the treatment of injured parts of the body, such as broken limbs or arthritic joints, which is a very important area of medical practice.

In the treatment of injured parts of the body such as broken limbs, or joints affected by certain complaints, it is usually necessary to immobilise the part in order that healing may be effected. In conventional practice, this is done by wrapping the injured limb to a splint or encasing it in plaster of Paris. Both of these procedures, while clinically effective, are associated with several disadvantages, and cause a certain amount of inconvenience both to the attendant physician and patient. For instance, conventional plaster of Paris is heavy and bulky, so that the patient's movements are restricted. Also, its preparation as well as its application in the formation of the cast are time-consuming and tedious procedures. Further, in removing the cast from the part being treated, it must be destroyed, and this single service use is inefficient and uneconomic. Moreover, it is extremely difficult to ensure that the plaster cast fits closely to the body contours, as is desirable for many therapeutic supports, for example, in the treatment of arthritic pain.

Of recent years, as an alternative to plaster of Paris for a limited number of purposes, splints have been made from a thermoplastics material such as polyethylene in the form of a solid sheet. In forming these splints, the polyethylene is heated to a temperature at which it is soft and deformable and, in this condition, moulded to the required shape. The high temperature needed to soften the polyethylene (around 150° C.), combined with the fact that it is employed in solid form, exclude direct moulding onto the patient. This is also a disadvantage of a known modification of this type of splint, in which the solid polyethylene sheet is lined with a flexible spongy material such as a thermosetting polyurethane. In laminate structures of this sort, the polyethylene layer is needed to hold the flexible polyurethane layer to the required shape when the laminate has cooled and set. In such laminates, the presence of the polyethylene face layer hinders the diffusion of heat away from the polyurethane so detracting from the good thermal insulating properties of the latter to an extent that, in practice, the laminate cannot be moulded direct. Moreover, the polyethylene on the outside of these laminates makes them difficult to handle and mould at the temperatures to which they are heated. In both instances, therefore, it is necessary to take a conventional plaster cast of the injured part, and then to utilise this negative in the preparation of the thermoplastic splint.

The orthopaedic of this invention, which are derived from suitable expanded thermoplastics materials, are superior in many important practical respects to previous support forms such as the conventional cast or laminate construction. This superiority is attributed to a combination of certain properties exhibit by the expanded thermoplastics materials including the following:

(i) When heated to a plasticising temperature, they become pliable in which condition they can be readily moulded.

(ii) The materials have a low thermal conducitvity and heat storage capacity. Accordingly, even at the plasticising temperature, say around 140° C., they can be applied safely to a living body (human or other animal) which would be caused pain or injury, by considerable exposure to such a temperature. Just as important, while in the platsicised state they may conveniently be handled and applied by the attendant physician or an assistant. Hence, they can easily be moulded to the required shape so providing an anatomically correct support, i.e. good correspondence to the body contours.

(iii) When allowed to cool and set, they regain their original rigidity, so that they hold, without requiring assistance, the impression imparted by the moulding operation. This again facilitates the obtention of an anatomically correct support.

(iv) The materials are light-weight, so that the patients movement is less restricted than with a conventional cast, and they permit easier X-ray examination.

(v) The materials are buoyant so that hydrotherapy, which is often desirable with some conditions, such as paralysis, is possible with the support in position.

(vi) The materials are non-irritating, and readily obtainable in a toxicologically inert form.

(vii) Flammability is usually low and, further, flame resistance is easily imparted.

(viii) The materials are auto-adhesive at the plasticising temperature, but at room temperature they do not stick to the skin. Consequently, the support may be conveniently and speedily removed for examination or, when necessary, interim treatment of the injured part. As a corollary to this, the support may be reused upon the same patient (with or without reshaping), or (with reshaping) upon successive patients.

(ix) The expanded materials are resilient so that they provide a "cushioned" support in which the abrasive and bruising hazards associated with previous thermoplastics supports are minimised.

(x) The materials are durable and are resistant to hot water and detergents so that the support withstands cleaning.

Thus, in practising this invention in surgery a blank of appropriate size, shape and thickness for the part of the patient to be supported is cut from a sheet of the rigid or semi-rigid expanded thermoplastics material. This is heated to its plasticising temperature and, immediately, while it is still plastic and pliable, moulded to the shape of the part and then, desirably while maintaining the assembly substantially immobile, allowed to cool and set when a rigid support is obtained. The material may be moulded either by pressing the part with the plasticised and pliable material, or simply by wrapping and simultaneously stretching the material around the part.

If, for any reason, it is not convenient to mould the material by direct contact with the body, it may be moulded to a model or to a plaster or other cast of the part that is to be supported.

Suitable expanded thermoplastics materials for this purpose include, for example, polyethylene, ethylene copolymers such as copolymers of ethylene with vinyl acetate, typically, the copolymer available commercially as Evazote sheet ("Evazote" is a registered trademark), or with ethyl acrylate, polypropylene, polystyrene, and polyvinyl chloride. A highly preferred material for this application is a nitrogen-filled cross-linked low density polyethylene such as the material Plastazote referred to hereinbefore. This material, it has been found, holds the impression imparted during the moulding operation better than other materials, such as expanded low density polyethylene unmodified through cross-linking. The better retention of the impression, which is attributed to the cross-linking, is reflected in a closer correspondence to the contours of the part to be supported. Best results have been obtained using Plastazote in which the level of cross-linking is that resulting from exposure of the material to 5–7 megarads of radiation, or from heating in the presence of between 2 and 3 parts by weight of an organic peroxide per 100 parts by weight of the polyethylene.

The physical properties of Plastazote and Evazote, which permit them to be moulded directly around a part of the patient without any serious discomfort or injury are summarised in the table below, and compared with the similar properties for unexpanded low density polyethylene which cannot be moulded direct.

TABLE

| Property | Plastazote | Evazote | L.D. polyethylene |
| --- | --- | --- | --- |
| Density (gms./cc.) | 0.04 | 0.048 | 0.92 |
| Thermal conductivity (Cals./cm.$^2$/cm./sec./° C.) | $1.1 \times 10^{-4}$ | $1.2 \times 10^{-4}$ | $8.0 \times 10^{-4}$ |
| Specific heat (Cal./gm. at 20° C.) | 0.49 | 0.55 | 0.49 |
| Plasticising temperature (° C.) | 140 | 135 | 150 |

The thickness of the material employed will depend, of course, upon the part of the body for which the support is required, the size of the support, and the nature of the material. However, for most orthopaedic applications, the sheet of expanded thermoplastics material, say Plastazote, need be no more than about 2.5 cm. thick, and it is often less, with about 0.3 cm. being the usual lower limit.

The heating operation is conveniently carried out using a circulating air oven, though other means such as infrared radiation may be employed. It is important that the expanded material shall not be overheated, otherwise breakdown will occur. The temperature to be attained, and the period for which the material is held at this temperature depend upon the particular material employed and the thickness of the sheet. With 1.25 cm. thick Plastazote sheet, heating at a temperature of about 130 to about 150° C., conveniently 140° C., for about 5 to 10 minutes plasticises it without destroying its essential cellular character. With 0.6 cm. thick Plastazote an exposure time of about 4 to 6 minutes at this temperature is sufficient. When using Evazote sheet (1.25 cm.), a temperature of about 125 to about 145° C., conveniently about 135° C., and an exposure time at this temperature of about 5 to 10 minutes are generally suitable.

The low thermal conductivity of the expanded thermoplastics material may, in some instances, especially in warm climates, give rise to heat transmission and perspiration problems which may cause discomfort to the patient. This can be avoided or ameliorated by providing perforations in the material for ventilation. These can be easily made by punching holes through the material.

For some applications, as indicated hereinbefore, it may be desirable to incorporate reinforcing members within the mass of expanded thermoplastics material. Preferably the two are of the same material, i.e. the main mass consists of the expanded form of the thermoplastic material which constitutes the reinforcements.

A sheet of such a composite structure can be heated, just like the expanded material alone, to the temperature at which both the expanded material and the reinforcing member are pliable, and then moulded to the required shape to give, when cool and set, a light but stiff support. An important feature consists in the use of one or more comparatively small reinforcing pieces of the solid thermoplastics material strategically located to give local stiffness just where required in the finished support.

In a convenient method of preparing the composite structures, two sheets of the expanded thermoplastics material, say Plastazote, are cut to a size and shape according to the desired finished support. Pieces of an ordinary, solid thermoplastics material, in this instance preferably polyethylene, are sandwiched between the two sheets in the chosen positions. The sandwich is then heated in an oven to such a temperature that the sheets fuse to each other, and to the solid polyethylene sandwiched between them to form an integral mass, ready for thermoplastic shaping. The sandwich may be pressed during the heating operation to assist fusion.

When the expanded mass and the reinforcing pieces are of the same material, the temperature required for fusion is essentially the same as the plasticising temperature, i.e. about 140° C. in the case of polyethylene. Hence, if desired, the fusion and the softening needed for shaping can be effected in a single heating operation. Alternatively, the composite structures may be reheated for moulding to the shape required for the support. This procedure has the advantage that suitable shapes and sizes of the composite stuctures can be preformed for use as supports for different requirements.

There is a tendency for air pockets to form in the heated material, and these should be squeezed out by pressure rolling over the surface of the hot sandwich. When perforations are provided in at least one of the Plastazote sheets, some of the air from the pockets can be squeezed into and so escape from these perforations. When a sandwich is being built up of pre-perforated material the layers should desirably be properly located to align the perforations. This can be ensured by placing the two perforated layers in contact, matching up the perforations and then fixing the sheets by spot welding at convenient intervals. The reinforcing pieces may then be inserted between the layers in spaces between welds.

Where a large area of reinforcement is necessary, for example, in the back of a spinal support, it is advisable to provide an extra thickness of the expanded material between the solid reinforcing material, which has a relatively high thermal conductivity and heat storage capacity, and the body as extra thermal insulation for protecting the patient from heat during shaping. Desirably, there should be a substantial margin between the edge of the expanded material and the solid insert so that any flow of the latter when heated does not bring this material beyond the edge of the composite when shaped to the patient; this is to avoid risk of contact of the hot solid material with either the patient or the operator who is shaping the material.

The solid reinforcing material may be embedded within the expanded mass by techniques other than sandwiching. For instance pockets may be cut from the edge of a sufficiently thick sheet wide enough to enable the piece of solid reinforcing material to be inserted. The pockets must be wider than the insert to allow spread and long enough to allow spread and leave a small margin. The pockets may, for example, be cut by a hot knife which may be electrically heated.

For orthopaedic purposes, Plastazote of about 0.6 cms. thickness for each of the two outer layers of a sandwich is usually adequate for all supports with one or more inserts of about 0.16 cms. thickness of solid polyethylene. A further 0.6 cm. of thickness of Plastazote over a small area will usually suffice for the extra thermal insulation which may be needed over a reinforcement.

In building up a composite structure as previously described the heating is done in a oven. Fusion however has only to be inside the sandwich where the layers meet. Accordingly, the fusion may alternatively be effected by a dielectric heating and welding process wherein the sheets are held between electrodes connected to a high-frequency supply.

Another application for the articles of this invention is in the packaging field in which they provide wrappings, casings or packages for objects for which a resilient support may be desirable.

In practising this aspect of the invention using a single sheet of the expanded thermoplastics material, the sheet cut to an appropriate size, shape and thickness for the object is heated to the plasticizing temperature and immediately, while still soft and pliable, moulded to the shape of the object, and then allowed to cool and set. Moulding may be effected by pressing the object into the sheet or by wrapping and simultaneously stretching the sheet around the object. Alternatively, two or more blocks of the expanded thermoplastics material may be used, when the moulding is effected by pressing the heated blocks around the article so as to encase it.

The object may be removed just after the impression is formed in the moulding operation and before allowing the material to cool.

If, for any reason (for example, if the object would be damaged by contact with the hot material), it is not convenient to mould the material by direct contact with the object, it may be moulded to a model or cast of the object.

Suitable expanded thermoplastics material for this purpose include the materials specifically referred to in connection with the surgical and veterinary applications. As before, Plastazote is the preferred material and it is plasticized by heating to a temperature of around 140° C. for a short period, conveniently about 5 to 10 minutes. Where extra strength and stiffness are sought, one or more reinforcing members such as pieces of a solid thermoplastics material may be embedded within the expanded mass. The reinforcing member or members may be strategically located within the mass so as to surround, and thereby protect, the object in the wrapping, casing or package.

This invention is further described in the following illustrative examples and accompanying drawings wherein:

FIG. 7 is a perspective small scale illustration of an article in the form of a package for various objects.

The above figures will be referred to in some of the examples which follow:

EXAMPLE 1

Figure 1:
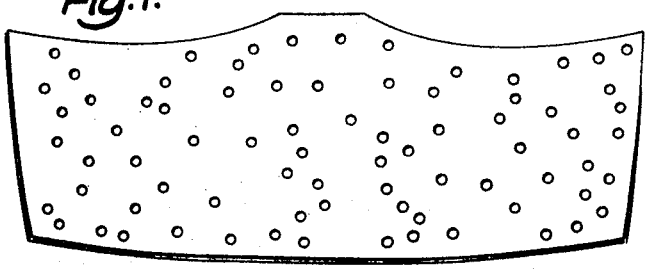
FIG. 1 is a diagrammatic small scale plan view of a flat piece of Plastazote suitably shaped for making a support in the form of a cervical collar.
Figure 2:
FIG. 2 is a perspective small scale illustration of the cervical collar as shaped by the operator.

This example is concerned with the preparation of a cervical collar and is illustrated by FIGS. 1 and 2 of the accompanying drawings.

A flat piece (45 cms. x 12.5 cms.) of Plastazote sheet is cut with a sharp knife from a larger sheet about 1.13 cms. thick, which contains many perforations (0.9 cm. diameter). The upper edge of piece is scallopped so that it has the shape shown in FIG. 1. The shaped sheet is placed in a circulating air oven in which the shelf is lined with a polytetrafluoroethylene release sheet to prevent adhesion. The temperature of the oven is thermostatically controlled at 140° C., and the sheet is held at this temperature for five minutes. The patient is positioned near to the oven. The plasticised sheet is then removed from the oven and a quick check made by touch to ensure that the surface temperature is not excessive. The patient is instructed to keep his head still and not to extend his neck. The operator, standing behind the patient, quickly brings the softened and pliable sheet up to the patients neck with the high point on the chin. He then manually stretches the material gently but firmly, first from one side, then the other, so moulding it into a shape closely conforming to the throat and neck. The Plastazote sets as it cools, and the light-weight, resilient, anatomically correct collar is illustrated in FIG. 2 is obtained after 3–4 minutes, for which period the patient keeps his neck as still as possible. The collar is then removed and, when quite cool, trimmed and finished using a sharp knife, an emery wheel and No. 1 glass paper. Any marks on the collar are removed with hot water and detergent. A Velcro (registered trademark) holding strap retained in place with double sided adhesive tape is attached to the collar so that it may be held, securely and comfortably, in position.

Where extra strength and stiffness are called for, the cervical collar may be moulded from a composite structure in which a piece of solid polyethylene is embedded within a mass of Plastazote. The solid reinforcement is so positioned in the composite structure that it is located at the front of the resulting collar.

EXAMPLE 2

Figure 4:
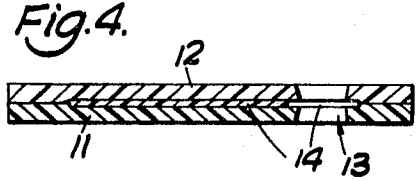
FIG. 4 is a cross-section along the line IV—IV of FIG. 3.
Figure 3:
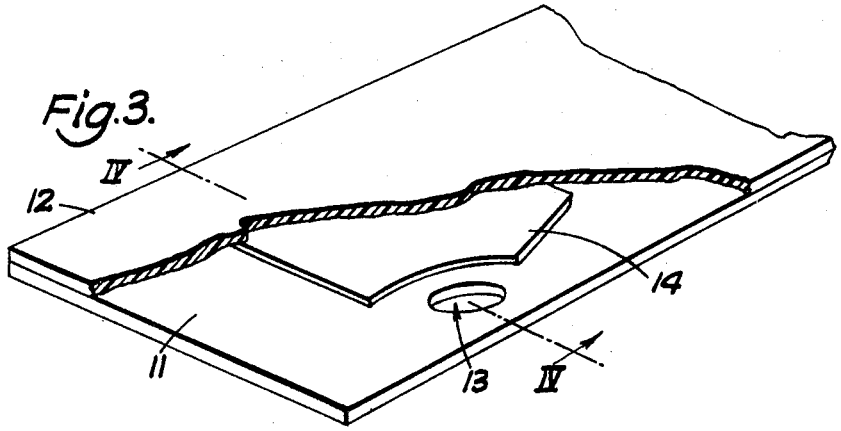
FIG. 3 is a partial fragmentary small scale plan view of a composite structure suitable for making a reinforced splint for the forearm, showing the arrangement of layers.
Figure 5:
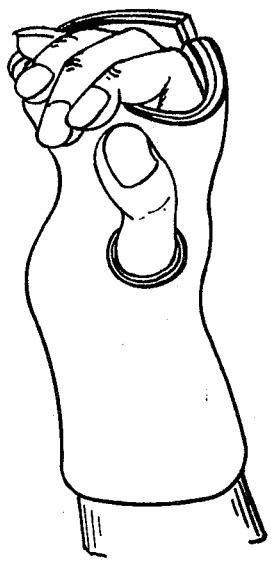
FIG. 5 is a perspective small scale illustration of the splint in position.

This example is concerned with the preparation of a reinforced forearm splint, and reference will be made to FIGS. 3–5 of the accompanying drawings.

Two rectangular pieces 11 and 12 of 0.6 cm. thick Plastazote sheet are cut to an appropriate size and shape for the particular forearm to be supported. A hole 13 to accommodate the thumb is punched in each sheet. The diameter of this is slightly less than the diameter of the proximal joint. A shaped sheet 14 of solid polyethylene of a high viscosity grade and non-toxic quality is inserted, and correctly located, between the Plastazote sheets 11 and 12. The polyethylene sheet is about 0.16 cm. thick. A suitable grade of polyethylene is that marketed by Stanley Smith and Company, Isleworth, England, under the registered trademark "Vitrathene."

The three layer structure is placed in an oven in which the shelf is dusted with French chalk, and heated for 6–7 minutes at 140° C. The layers fuse together to give an integrated structure and all are softened. The pliable composite is then removed from the oven and brought up to the under surface of the forearm. After pushing the patient's thumb through the hole 13, the operator moulds the pliable sheet by hand pressure around the forearm. It sets in about 4 minutes to give a firm splint as illustrated in FIG. 5 in which the solid polyethylene sheet 14 extending from the metacarpal palmar surface down the centre of the splint to about 2.5 cms. from the end of the splint on the forearm gives local reinforcement. After trimming and finishing, straps are attached to the splint so that it may be held securely in position.

Where only a light forearm support is needed, as with many rheumatoid arthritis cases, the splint may be fashioned from about 1.3 cms. thick Plastazote without reinforcement. In the absence of the solid polyethylene, the Plastazote plasticises in a shorter time so that it need be in the oven for only about 5 minutes, and it also sets in less time.

EXAMPLE 3

This example is concerned with the preparation of a foot support for a patient sufferring from metatarsalgia.

A first piece of Plastazote about 1.3 cms. thick is cut to about 30 cms. x 10 cms. A second piece of Plastazote also about 1.3 cms. thick cut to an oval shape and approximately 7.5 cms. long and 3 cms. wide is placed on top, and toward the centre, of the first piece. The assembly is then heated in an air oven set at 140° C. until soft and pliable (about 5 minutes). Meanwhile, the patient is seated close to the oven, and another piece of 30 cms. x 10 cms. Plastazote placed on the floor in front of him. The pliable assembly is removed from the oven, its upper surface dusted with French chalk (to assist in obtaining an accurate impression), and then placed on the unheated piece of Plastazote which serves as a cushion. The patient stands, places a foot on the material in such a position that the thickest part of the Plastazote is behind the metatarsal heads. He then presses down, if possible with his full weight, for about 1–2 minutes. During this time, the foot is held still to prevent movement which could destroy the moulding, and the operator presses in the sides of the material so as to compress it and push it upwards under the arch of the foot. The Plastazote sets in about 2 minutes, but it is advisable to wait a further minute before the patient removes his foot. When the material is quite cool, it is trimmed and finished to give an insole with the shape required for the particular footwear. In trimming, the material should be carefully thinned down under the toes so as to leave the maximum amount of material where the depression has been formed. It is best to make two insoles at the same time, so that there are two identical supports for wearing on alternate days.

The insole so-obtained may then be disposed in the patient's footwear or used to make sandals. The sandals may be made by attaching a long sole of a micro-cellular rubber about 0.5 cm. thick to the under surface of the material. An elastic or webbing strap is fitted behind the metatarsal heads between the microcellular rubber and the material. The patient can slip his foot under this elastic (or webbing) strap and is provided with a simple, yet comfortable sandal. Many patients who suffer from gross metatarsalgia have never been able to wear sandals, and it is a great relief to them not to be restricted to surgical boots or shoes.

Plastazote foot supports made in a similar way, except that the oval piece included for localised addtiional thickness may be omitted, to the insole of this example are also useful in the following conditions.

Painful heels

Patients with an os Calcis spur or a painful heel find supports made of Plastazote and extending to the metatarsal heads most satisfactory. The material, during the moulding operation, depresses at the heel and, therefore, the weight, is transferred to the long arch.

For geriatric patients with sore heels, heel boxes and anklets for wearing in bed have proved very satisfactory. These are moulded directly from 0.6 cm. thick Plastazote. Perforations of about 0.6 cm. diameter are made in the supports. They are held in position by means of tape passing through the holes nearest to the facings of the supports.

Hallux rigidus

Full length insoles moulded with a depression to accommodate the big toe give relief.

Hansons disease

Where gross deformities result from leprosy, a 2.5 cm. thick Plastazote insole carefully shaped to the foot gives relief. By incorporating a micro-cellular sole, and a very low heel a patient can walk in absolute comfort and need not worry that the depressions will become rubbed and made sore. Further, there is some evidence to suggest that the direct contact between the ulcerated foot and the Plastazote assists healing.

EXAMPLE 4

This example illustrates the formation of surgical footwear in which shaped Plastazote instead of the conventional cork is used to compensate for leg shortening.

In the formation of surgical footwear a press is used to fix the soles to the uppers. In a similar way a press can be used to shape a Plastazote sheet to the last of the patients' shoes. This is done by heating a piece of the material at 140° C. for about 5 minutes, placing the last on top of it, and then applying the assembly to the press. Having obtained the impression of the last on top of the material, the elevation is then built to the required height, say, 3.8 cms. at the heel, 2,5 at the tread and 1.3 cms. at the toe. This elevation shapes readily, and the finish is good. Any allowance needed in the shoes to accommodate the Plastazote insole may be provided for by increasing the depth of the last by applying a 0.6 cm. thick piece of cork to the bottom of it. The advantages of such an elevation include the following:

(i) A Plastazote raise is only one third of the weight of a similar raise in cork so that the shoe is lighter;

(ii) As Plastazote is flexible and cork rigid, shoes made in the former material give freedom of movement at the metatarsal joints; and (iii) The material can be moulded readily on to the base of a last and shaped to give a level base before making a shoe. The conventional method of shaping and fitting a cork insole to the base is time consuming.

EXAMPLE 5

This example illustrates the formation of a spinal support used, for instance, in the treatment of scoliosis or lumbar sacral strain.

A composite structure is made following the procedure of Example 2 except that the perforated Plastazote sheets are cut to a size and shape appropriate to this sort of support and the individual patient, the sheets contain no thumb hole, the solid polyethylene reinforcement is centrally located, so that in the finished support the strengthening piece is in the spinal area, and a third piece of Plastazote is laminated to the side which is to be in contact with the patient. The additional piece of Plastazote provides extra thermal insulation which is desirable because the polyethylene reinforcement (which may be fairly extensive) has a relatively high thermal conductivity. For scoliosis, where the deformity is to one side, the polyethylene strengthening piece is extended to the affected side. The plasticised composite structure is removed from the oven. Meanwhile, as much correction as possible is obtained using a head halter and, with the back of the patient stretched, the pliable material is applied round the trunk, and moulded by stretching and pressing. When a satisfactory fit is obtained, the support is held immobile either manually or by means of an elasticated clamping device. After about 4–5 minutes, when the support is removed. When quite cool, it is trimmed and finished in the usual way. Four holding straps fixed to the support help to retain it comfortably in position in daily wear.

Aside from the specific applications illustrated in the foregoing examples, there are a number of similar applications for this invention including, for instance, leg splints, elbow splints and the formation of external prostheses. The splints generally require reinforcement. The strengthening piece for a leg splint is usually placed at the back of the leg, the width being dependent on the size and deformity of the limb. The strengthening piece for an elbow splint is usually placed at the centre of the centre of the elbow, the depth depending upon the disability. In the formation of external prostheses, such as an artificial muscle for an atrophied leg, a sheet of flesh-coloured plasticised Plastozote is applied to the affected leg, and carefully shaped to match the normal leg. After smoothing down the edges it is worn under a thin elastic stocking covered by an ordinary stocking. The prosthesis is almost invisible. The lightness of the prosthesis and freedom from the embarrassment occasioned by odd-sized calves and muscles are great advantages. Other prostheses which have been fashioned from plasticised Plastazote include foot prostheses after Symes amputations, and an artificial buttock after a hindquarter amputation.

EXAMPLE 6

Figure 6:
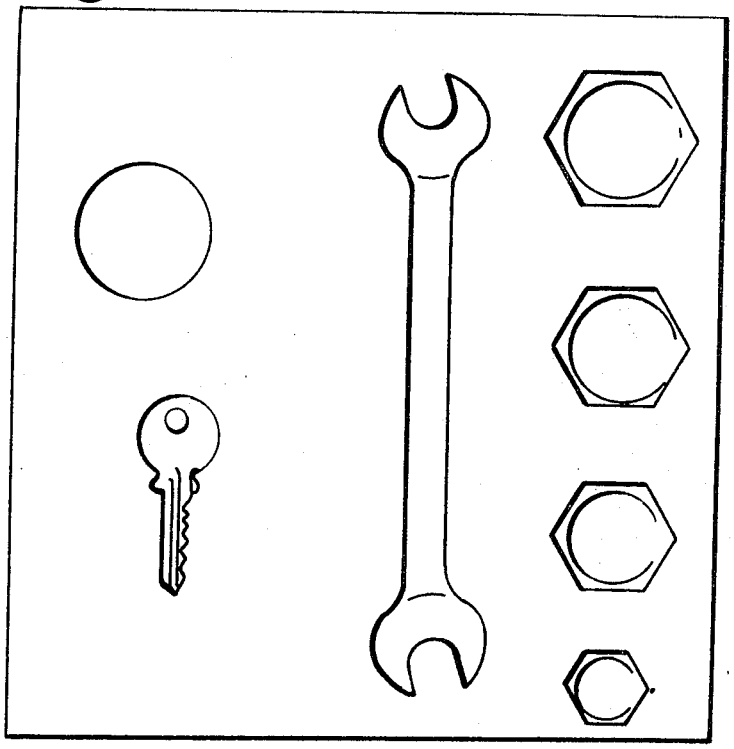

This example illustrates the application of this invention in the packaging field, and is illustrated by FIG. 6 of the accompanying drawings.

A 20 cms. square block of 3.8 cms. thick Plastazote is placed in a circulating air oven and heated at about 140–150° C. for about 5 minutes. At the end of this period, the softened Plastazote was removed from the oven. The articles to be packaged, in this instance, a spanner, key, golf ball and four hexagonal nuts, were individually pressed into a surface of the material. A pressure of about 2–3 p.s.i. is all that is required to give an accurate, deep impression, and this is easily obtained. The pressure is maintained for about 2 minutes, during which time the Plastazote sets so that the impressions are "fixed" in the material. Thereafter, the articles may be kept in position, or removed while the material cools. The shaped block so-obtained provides a resilient, open package for the various articles which are firmly held, yet visible and easily accessible.

If desired, a two-part package may be formed by pressing two blocks of the Plastazote around the articles, one at each side, so that the articles are received partly in each block.

What we claim is:

1. A method of forming a cast for a portion of a living body from a sheet of a nitrogen expanded, at least partially cross-linked, low-density polyethylene, said polyethylene having a degree of cross-linking corresponding to that resulting from an exposure thereof to 5–7 megarads of radiation, said sheet having an initial thickness in the range of from about 0.3 centimeters to about 2.5 centimeters, said method comprising:

(a) heating a sheet of said polyethylene to a temperature within the range of from about 130° C. to about 150° C. to thereby plasticize the sheet and render the same pliable without destruction of its expanded, cellular character;

(b) placing the heated sheet into direct contact with a portion of a living body and applying sufficient pressure to the pliable sheet to cause the same to be shaped into a cast having a configuration complementing the shape of said portion; and (c) permitting said shaped cast to cool so that it resumes its original degree of rigidity.

References Cited
UNITED STATES PATENTS

| | | | |
|---|---|---|---|
| 3,098,832 | 7/1963 | Pooley | 264—54 X |
| 3,229,011 | 1/1966 | Sutz | 264—322 X |
| 3,255,877 | 6/1966 | Kracht | 264—321 UX |
| 3,326,211 | 6/1967 | Logue | 128—90 |
| 3,341,480 | 9/1967 | Feild | 264—54 X |

(Other references on following page)

| | | UNITED STATES PATENTS | |
|---|---|---|---|
| 3,341,481 | 9/1967 | Palmer | 264—54 X |
| 3,400,810 | 9/1968 | Makowski | 264—321 X |
| 3,442,265 | 5/1969 | Malvern | 128—90 |
| 3,446,880 | 5/1969 | Enicks | 264—321 |
| 2,759,475 | 8/1956 | Swaay | 264—321 X |
| 3,048,169 | 8/1962 | Pierce | 264—321 X |

FOREIGN PATENTS 899,389  6/1962  Great Britain.

OTHER REFERENCES

Solid Polyurethane Elastomer, Wright P. Cumming, A.P.C. London, Aug. 10, 1970, pp. 179–198.

JULIUS FROME, Primary Examiner

P. A. LEIPOLD, Assistant Examiner

U.S. Cl. X.R.

128—89 R, 90; 206—65 R; 264—54, 222, 322